United States Patent
Ffrench et al.

(10) Patent No.: US 11,126,468 B2
(45) Date of Patent: Sep. 21, 2021

(54) AGENT DRIVEN CLUSTER GATING FOR SERVICE MANAGEMENT

(71) Applicant: Red Hat, Inc., Raleigh, NC (US)

(72) Inventors: David Ffrench, Waterford (IE); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/517,449

(22) Filed: Jul. 19, 2019

(65) Prior Publication Data
US 2021/0019193 A1  Jan. 21, 2021

(51) Int. Cl.
G06F 9/44 (2018.01)
G06F 9/50 (2006.01)
G06F 21/52 (2013.01)
G06F 11/07 (2006.01)
G06F 11/30 (2006.01)

(52) U.S. Cl.
CPC ........ *G06F 9/5055* (2013.01); *G06F 11/0793* (2013.01); *G06F 11/302* (2013.01); *G06F 21/52* (2013.01)

(58) Field of Classification Search
None
See application file for complete search history.

(56) References Cited

U.S. PATENT DOCUMENTS

| 9,026,996 | B2 | 5/2015 | Ramachandran | |
|---|---|---|---|---|
| 10,001,983 | B2 | 6/2018 | Roy et al. | |
| 10,042,626 | B2 | 8/2018 | Nekrestyanov et al. | |
| 2013/0047140 | A1* | 2/2013 | Shann | G06F 11/3612 717/128 |
| 2014/0096113 | A1* | 4/2014 | Kuehlmann | G06F 11/3676 717/126 |

(Continued)

FOREIGN PATENT DOCUMENTS

CN  103942063 B  4/2017

OTHER PUBLICATIONS

Corsava et al., "Self-Healing Intelligent Infrastructure for Computational Clusters", Harrow School of Computer Science University of Westminster, London, May 28, 2014, https://www.researchgate.net/publication/228724182_Self-healing_intelligent_infrastructure_for_computational_clusters.

(Continued)

*Primary Examiner* — Anna C Deng
(74) *Attorney, Agent, or Firm* — Womble Bond Dickinson (US) LLP

(57) ABSTRACT

Described is a system and method that includes performing a static analysis on code in view of a first set of rulesets, each ruleset in the first set of rulesets defining criteria for validation of the code in a first development stage. In response to validation of the code in view of the first set of rulesets, configuration information for each of a second set of rulesets may be transmitted to a dynamic agent, each ruleset in the second set of rulesets defining criteria for validation of the code in a second development stage, wherein the dynamic agent is in a limited functionality state. The dynamic agent may be brought to a full functionality state in response to receiving the configuration information for each of the second set of rulesets and may perform a dynamic analysis on the code in view of the second set of rulesets.

18 Claims, 6 Drawing Sheets

(56) References Cited

U.S. PATENT DOCUMENTS

| | | | | |
|---|---|---|---|---|
| 2015/0309813 | A1* | 10/2015 | Patel | G06F 8/75 |
| | | | | 703/22 |
| 2016/0070550 | A1* | 3/2016 | Van Eijndhoven | G06F 30/327 |
| | | | | 717/156 |
| 2019/0303623 | A1* | 10/2019 | Reddy | G06F 11/3692 |

OTHER PUBLICATIONS

"CCP Documentation-Release", OpenStack Foundation, Nov. 15, 2017, https://buildmedia.readthedocs.org/media/pdf/fuel-ccp/latest/fuel-ccp.pdf.

"Fusion Middleware Administering Clusters for Oracle WebLogic Server", Oracle, 2007, https://docs.oracle.com/middleware/1213/wls/CLUST/dynamic_clusters.htm#CLUST719.

\* cited by examiner

AGENT DRIVEN CLUSTER GATING FOR SERVICE MANAGEMENT

BACKGROUND

An application may be one or more programs (e.g., computer programs), software, etc., that may be used by users, other applications, devices, etc., to perform various tasks, actions, functions, operations, methods, processes, calculations, etc. The application may be divided into components, modules, portions, etc., that may perform different functions, operations, actions, processes, methods, etc., for the application, and may provide different services, functionalities, or resources for the application. The process or cycle for developing (e.g., creating, coding, implementing, etc.), testing, and maintaining the application (or the modules and components of the application) may be referred to as a development pipeline. The development pipeline may also be referred to as an application development pipeline, a development cycle, an application development cycle, etc.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A code development and testing system may be used to develop, test, deploy, or maintain an application. For example, a development system may be used by programmers or developers to implement (e.g., code) the application. In another example, the system may be used by programmers or developers to test portions or all of the application. In a further example, the system may be used to deploy the application to users (e.g., to end users of the application). The development pipeline for an application may include various stages or phases. Each stage or phase of the development pipeline may use computing resources of the development system. For example, each stage or phase of the development pipeline may use memory (e.g., random access memory (RAM)), storage space, computing devices, network bandwidth, etc., of the development system.

Testing, and preparation of new code is a time consuming process that involves multiple steps and check points. This issue is exacerbated when the code is made up of a large number of constituent parts, which is the overall aim of microservices. The testing system may not be up to date with the latest versions of the code and the latest versions of the code may be subject to various hard production checks that the developer may enforce. These production checks may reveal security and other issues in the code. In addition, manual intervention is often required upon identification of such issues. Further, release deployment to numerous production clusters is both time consuming and high risk.

Aspects of the present disclosure address the above noted and other deficiencies by performing a static analysis on code in view of a first set of rulesets, each ruleset in the first set of rulesets defining criteria for validation of the code in a first development stage. In response to validation of the code in view of the first set of rulesets, configuration information for each of a second set of rulesets may be transmitted to a dynamic agent, each ruleset in the second set of rulesets defining criteria for validation of the code in a second development stage, wherein the dynamic agent is in a limited functionality state. The dynamic agent may be brought to a full functionality state in response to receiving the configuration information for each of the second set of rulesets and may perform a dynamic analysis on the code in view of the second set of rulesets.

Figure 1A:
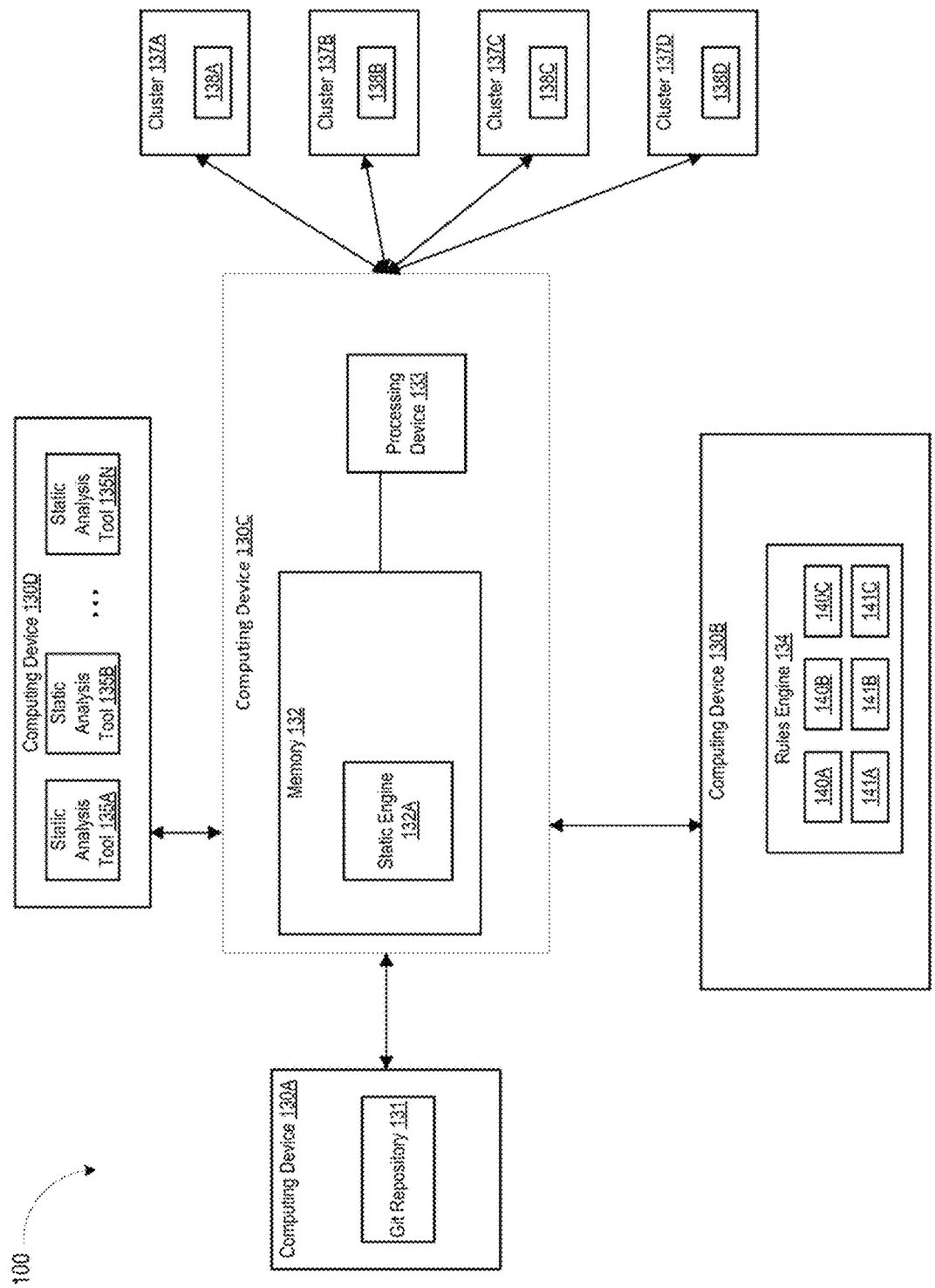
FIG. 1A is a block diagram illustrating an example of a code testing system, in accordance with some embodiments of the present disclosure.
Figure 1B:
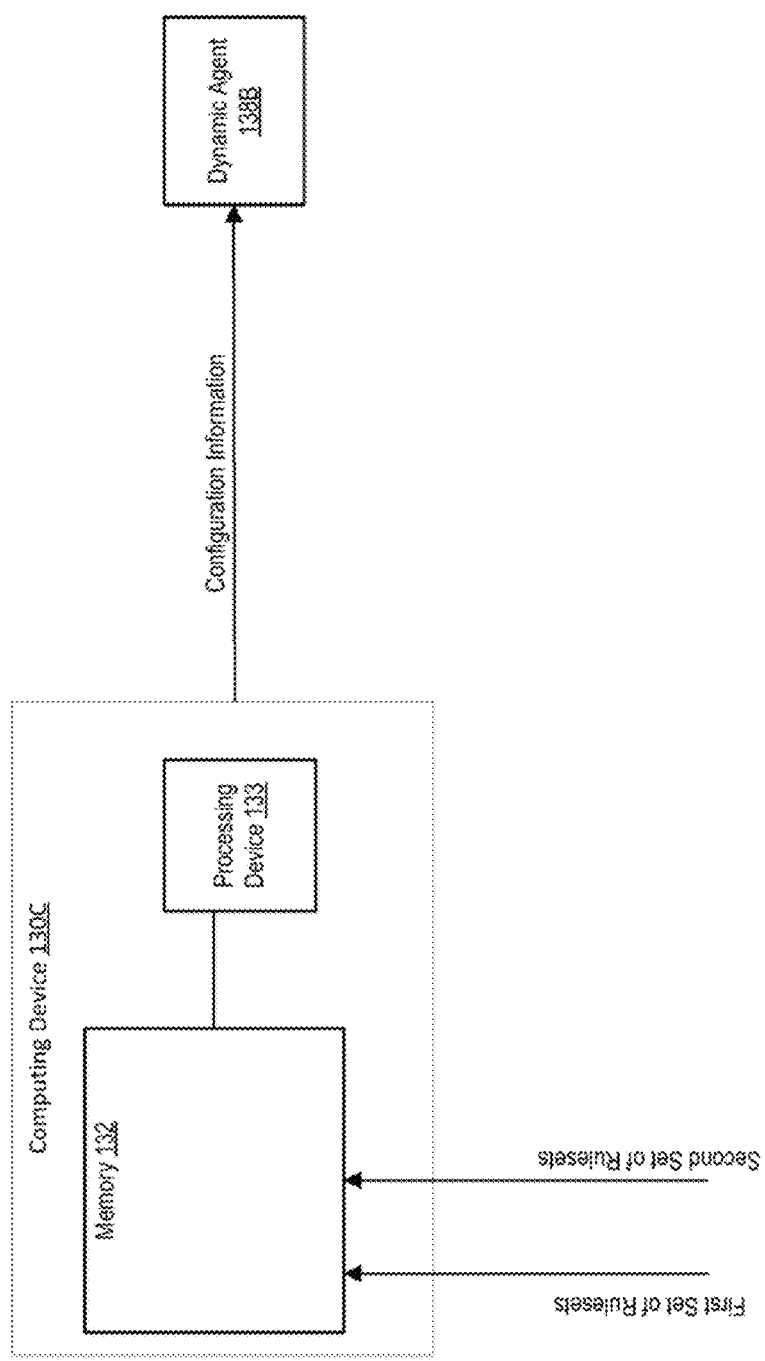
FIG. 1B is a block diagram illustrating an example of a code testing system, in accordance with some embodiments of the present disclosure.

FIG. 1A is a block diagram that illustrates an example code testing system 100, and FIG. 1B is a block diagram of a simplified version of the code testing system in accordance with some embodiments of the present disclosure. As illustrated in FIG. 1A and/or FIG. 1B, the testing system 100 may include computing devices 130A-130D as well as clusters 137A-137D. Although illustrated as having only computing devices 130 and clusters 137 for simplicity, testing system 100 may include any appropriate number of components (e.g., network devices, computing devices, containers, virtual machines, applications). The components of the testing system 100 may be connected as part of a public network (e.g., the internet), a private network (e.g., a local area network (LAN) or wide area network (WAN)), or a combination thereof. In one embodiment, testing system 100 may include a wired or a wireless infrastructure, which may be provided by one or more wireless communications systems, such as a WiFi™ hotspot connected with the testing system 100 and/or a wireless carrier system that can be implemented using various data processing equipment, communication towers (e.g. cell towers), etc. The testing system 100 may also include various components such as switches, routers, bridges, gateways, servers, computers, cables, virtual machines, integrated circuits, etc. which may carry communications (e.g., data, messages, packets, frames, etc.) between computing devices 130 and clusters 137 as well as any other components of testing system 100.

In one embodiment, each computing device 130 and each cluster 137 may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). The computing devices 130 and clusters 137 may each comprise any suitable type of computing device(s) or machine(s) that has a programmable processor including, for example, server computers, desktop computers, laptop computers, tablet computers, smartphones, set-top boxes, etc. The clusters 137 may be a single machine or may include multiple interconnected machines (e.g., multiple computers configured in a cluster). In another embodiment, one or more of computing devices 130 and/or clusters 137 may be a virtual machine (VM). A VM may be an emulation a computing device. The VM may execute on a hypervisor (not shown) which executes on top of an operating system for a host computing device. The hypervisor may manage system resources (e.g., may manage access to hardware devices, such as processors, memories, storage devices, etc., of the host computing device). The hypervisor may also emulate the hardware (or other physical resources) which may be used by the VMs to execute software and/or applications.

As illustrated in FIG. 1, computing device 130A may include a git repository 131, which may store all code files that are under revision control as well as additional data related to these files (such as the complete history of changes or information about who made those changes and when) for a single code development project. Computing device 130B may include a rules engine 134. The rules engine 134 may include gates 140A-C and 141A-C. Each gate may be comprised of a ruleset that defines criteria by which code in development will be tested and verified. The rules engine 134 may allow a user to generate a gate by defining a ruleset. The development of code may take place over a number of environments that each describe a distinct space for an application to run during a particular stage of a development pipeline (not shown). Typical environments include development, test, stage, and production, for example.

The development pipeline (or process) may be a cyclical pipeline, as discussed in more detail below. One type of development pipe line may be a continuous integration continuation delivery (CI/CD) pipeline. A CI/CD pipeline may be a pipeline or process where an application, or modules and components of the application, are built (e.g., compiled), tested, and deployed (e.g., released to users) in shorter time periods. For example, new code for the application may be built, tested, and deployed every few hours, every day, or every appropriate time period. The testing of the application, or modules and components of the application, may take place over a number of environments as discussed above, and may be performed when code e.g., source code, programing code, etc.) is checked into a version control system (e.g., git repository 131 or a source control system etc.). For example, testing of the application may be performed automatically when new code for the application is checked in to the git repository 131. Each environment may have one or more gates associated with it, all of which must be "passed" by the code in order to move to the next environment. Stated differently, the code must meet the criteria specified by each gate associated with an environment in order to move to the next environment (stage of development). A ruleset may define criteria for code security level, code complexity, other common vulnerabilities and exposures (CVEs) and/or resource usage that code must meet in order to for the code to be verified as appropriate for continuing through to the next stages of the development lifecycle.

A ruleset may comprise a file that includes actions, rules, and tolerances etc. which may define criteria of a particular type as well as pre and post analysis actions etc. In some embodiments, a ruleset may be implemented in a comma separated values (.csv) file, a plain text file or any other appropriate file type. Certain rulesets may be defined for static analysis of code, and may be appropriate for execution by static engine 132A (e.g., during an early development environment). In addition, some rulesets may comprise richer representations that include features such as operators which define more advanced production ready rules that are appropriate for dynamic analysis of live/running code (e.g., for later development stage environments such as staging or production). Such advanced rulesets may represent an actual playbook whose configuration information can be sent by static engine 132A to a dynamic agent 138 for use in dynamic analysis of code, as discussed in further detail herein.

A ruleset may specify criteria regarding the level of security vulnerability that is acceptable (e.g., minor, major, critical, blocker), the level of testing coverage desired, the level of integration test failures that will be tolerated, signal-metric complexity (e.g., how deeply nested loops in the code are), resource usage and other code specific interactions. In one example, a ruleset may define when a migration is appropriate based on resource usage, (e.g., a migration may not be permitted when the CPU usage is over 80% because of the risk of resource shortage issues).

A ruleset may also specify timing criteria, to ensure that the latest versions of the code are released. Some rulesets are defined for implementation by a static analysis tool. For example, a gate 140A may include a ruleset defining a security vulnerability tolerance, or, stated differently, the level of security vulnerability (e.g., minor, major, critical, blocker) that is acceptable as well as certain actions to take based on security vulnerabilities detected. The ruleset of gate 140A may be defined for implementation by a static analysis tool such as static analysis tool 135A to apply to the code. The ruleset of the gate 140A may instruct the static analysis tool 135A to look for any security vulnerabilities and flag those that are above a major vulnerability as unacceptable. The ruleset may also include instructions/actions to not release the code or take any actions until any major and critical security vulnerabilities and security flaws have been remedied and/or perform a rollback. In another example, a gate 140B may include a ruleset instructing a static analysis tool 135B to examine how deeply nested loops are in the code and flag those that are beyond a certain nesting criteria. The ruleset of gate 140B may include instructions/actions to flag code having a level of nesting beyond the nesting criteria as unacceptable and require the developers to address the issue or perform a rollback etc.

In some embodiments, an early environment (e.g., development or testing) may be associated with gates 140 that each have a ruleset defined for execution using the static engine 132A, while later environments (e.g., staging or production) may be associated with gates 141 that each have a ruleset defined for execution using a dynamic engine 138. IN some embodiments, gates 140 may include rulesets defining less stringent and less advanced/complex criteria than rulesets for gates 141. Although illustrated in FIG. 1 as having a set of 3 gates 140A-C for an early environment and a set of 3 gates 141A-C for a later stage environment for ease of illustration, any appropriate number of gates may be defined for and associated with each environment in the development lifecycle.

The rules engine 134 may include a gate 141A which may include a ruleset defining a resource utilization profile that represents the optimal control range of hardware resource usage for the code. The resource utilization profile may be user defined by the rules engine 134 which may allow a user to define upper and lower bounds of resource usage for various different resources for the code. Examples of resource usage by the code may include memory usage, I/O cycle usage, network bandwidth usage and processor bandwidth usage among others.

Computing device 13011 may include a set of static analysis tools 135A to 135N. Each static analysis tool 135 may function to analyze the code to ensure that it meets various types of criteria such as security, complexity, etc. A static analysis tool 135 may analyze code based on a ruleset of a gate it is configured with. For example, static analysis tool 135A may be configured with the ruleset of gate 140A by static engine 132A to analyze the code to detect security vulnerabilities (minor, major, critical, blacker) and flag those that are above a major vulnerability as unacceptable. In another example, static analysis tool 135B may be configured with gate 135B by static engine 132A to examine how deeply nested loops are in the code and flag those that are beyond a certain nesting criteria, as well as enforce other code quality criteria, as discussed in further detail herein. Examples of static analysis tools 135A and 135B may be tools such as the Snyk™ tool and the SonarQube™ tool respectively. Static analysis tools 135 may include a variety of tools that can Check for common vulnerabilities and exposures (CVEs) based on the ruleset of the gate they are configured with.

Computing device 130C may include processing device 133 and memory 132. Memory 132 may include static analysis engine 132A (hereinafter referred to as static engine 132A), which may perform some of the functions described herein. The static analysis engine 132A may perform static analysis of code based on rulesets it is configured with and may enforce various code criteria for an early environment. A static analysis may be an analysis of code that is not currently executing. Because services such as the git repository 131 and static analysis tools 135 may be hook based, static engine 132A may connect to these services using API calls. Static engine 132A may detect when a change has been committed to the git repository 131. Examples of a change may include creation of a new branch, for example. Static engine 132A may detect when a change has been committed by polling the git repository or responding to a git hook, for example. Upon detecting a change, static engine 132A may apply the ruleset of one or more gates to the code to ensure that the code meets certain minimum standards for code security, complexity and other CVEs. For example, because the code has recently been changed, analysis at the development environment level may be appropriate and static engine 132A may apply the ruleset of each gate 140 to the code to ensure that the code meets certain minimum standards for code security, complexity and other CVEs. Static engine 132A may access each gate 140 from computing device 130B using an API call and send an API call to each static analysis tool 135 that is required for implementing the gates 140. For example, static engine 132A may send an API call to static analysis tool 135A which is a tool for analyzing code security. Static engine 132A may configure static analysis tool 135A with the ruleset of gate 140A and run the static analysis tool 135A on the code to determine whether the code has any security vulnerabilities. For example, the gate 140A may instruct the static analysis tool 135A to look for vulnerabilities of any level (minor, major, critical, blocker) and flag those that are above a major vulnerability as unacceptable. Static engine 132A may apply each of the gates 140 to the code in a similar manner before verifying that the code is safe and stable enough to enter into the next environment (stage of development) which may analyze the code using a dynamic agent 138 as discussed in further detail herein.

In some embodiments, upon determining that the code does not pass one or more gates 140, the static engine 132A may attempt to automatically (e.g., without user intervention or user input) resolve the issue at each gate that was not passed based on actions defined in the ruleset for gates that were not passed. For example, if a vulnerable dependency that exceeds a major vulnerability is detected through static analysis tool 135A (implementing the ruleset of gate 140A), static engine 132A may roll back the dependency version to a previous version. The static engine 132A may have access to the in al CI/CD process (not shown) for lifecycle management of the code, as well as git references to previously deployed versions of the code. The static engine 132A may use the git reference corresponding to the appropriate previous version of the code to fetch that version of the code via the internal CI/CD process and rebuild/redeploy the code to the previously deployed version of the code (a rollback). In this way, a previously validated version of the code may be restored. In some embodiments, the static engine 132A may automatically commit the change back into the git repository 131 based on the ruleset of gate 140A. In other embodiments, the ruleset of gate 140A may instruct the static engine 132A to automatically implement patch level changes, while for more significant roll backs the static engine 132A may notify a user that manual intervention is required. Thus, in this scenario, the static analysis engine 132A may mark the gate 140A as "not passed" and the code may not be promoted to the next stage in the development lifecycle (e.g., from testing to staging or production). The ruleset of gate 140A may also or alternatively include instructions/actions to flag code that does not meet the criteria (e.g., detection of a major vulnerability) as unacceptable and require the developers to address the issue or perform a rollback etc.

The static engine 132A may store a reference (not shown) to each linked cluster 137 for each environment type (e.g., development, production). Each cluster 137 may be associated with a particular environment type. For example, cluster 137A may be for staging, while cluster 137B may be for production. In addition, the static engine 132A may store configuration data for cluster creation, allowing for ad-hoc creation of new environments/clusters as needed.

Each cluster 137 may include two or more nodes (or members) that work together to perform a task. The nodes of a cluster 137 may be comprised of computing devices, virtual machines, or any combination thereof. Each cluster 137 may include cluster management software (not shown) that provides fundamental functions for the nodes to work together as a cluster (e.g., configuration-file management, membership management, lock management, and fencing). Each cluster 137 may also include software to automate deployment, scaling, and management of containers (illustrated in FIG. 2) and containerized applications. For example, each cluster 137 may run the Kubernetes™ system for managing the deployment of containers and containerized applications. Each cluster 137 may include a master node that acts as the unified endpoint for the cluster. All interactions with a cluster 137 are done via API calls, and the master node runs an API server process to handle those requests. The static engine 132A can make API calls directly via HTTP, gRPC or any other appropriate method. The dynamic agent 138B may reside on the cluster 137B in a limited functionality "listening" mode in which its resource consumption is minimal and can instantiate a full functionality version of itself on an as needed basis. For example, if the static engine 132A analyzes code based on gates 140 (as discussed above) and determines that the code meets the criteria defined by all of the gates 140, the static engine 132A may send a request to the dynamic agent 138B to perform a dynamic analysis of the code (e.g., in connection with a subsequent environment), causing the dynamic agent 138B to activate a full functionality instance of itself. The request may include configuration information for each gate 141 such as API routes, paths, authentication keys, and other configurations for the gates 141 as well as API routes, paths, authentication keys, and other configurations for any applicable static analysis tools 135 (e.g., static analysis tools 135A and 135B used to implement gates 141B and 141C respectively).

The dynamic agent 138B may perform a dynamic analysis of live (executing) code with gates that include rulesets defined for more advanced development stage/production ready criteria (e.g., higher thresholds for code security, complexity and resource usage) and a heavier focus on obtaining resource usage information from the live code for comparison with an optimal resource usage profile. A dynamic analysis may be an analysis of code that is currently being executed. As discussed above, each gate 141 may include a ruleset defined for execution using dynamic engine 138B. The request may include configuration information for gates 141, as well as configuration information for any applicable static analysis tools 135 as discussed in further detail herein. The dynamic agent 138B may perform a dynamic analysis of the code based on gates 141, provide results of the analysis to a user (e.g., via the static engine 132A), and then revert back to the limited functionality "listening mode" as discussed in further detail herein. In this way, the dynamic agent 138 may only utilize a significant amount of the cluster 137B's resources during dynamic analysis of the code, and thus may have a small resource usage footprint allowing it to save resources of the cluster 137B when it is not performing dynamic analysis of the code.

It should be noted that although illustrated in FIG. 1 as implemented on separate computing devices 130, one or more of git repository 131, static engine 132A, rules engine 134, dynamic agents 138 and static analysis tools 135 may be implemented using any appropriate number of computing devices.

Figure 2:
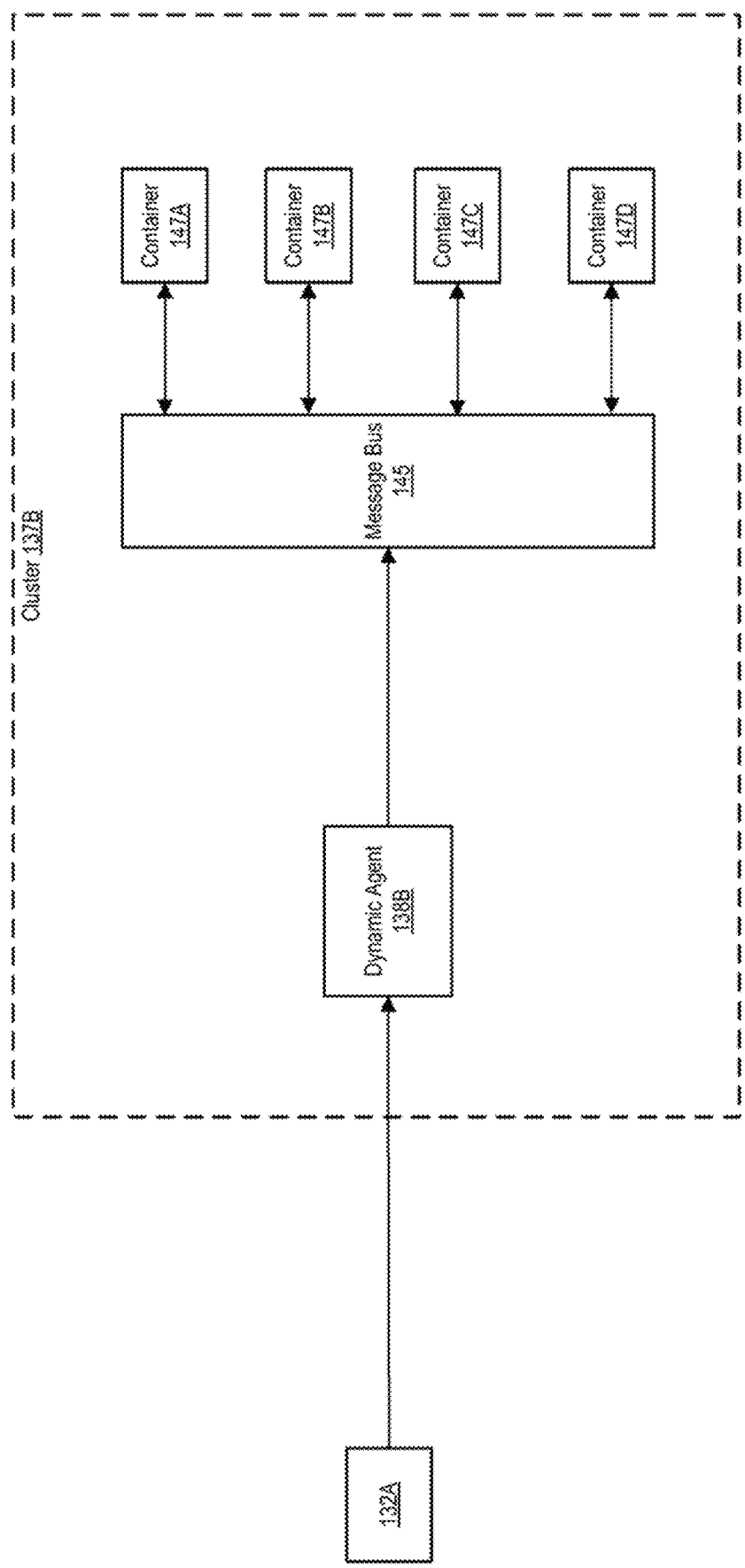
FIG. 2 is a block diagram illustrating an example of a cluster upon which a dynamic agent may execute, in accordance with some embodiments of the present disclosure.

FIG. 2 illustrates the cluster 137B illustrated in FIG. 1, in accordance with some embodiments of the present disclosure. The cluster 137B may include a dynamic agent 138B, a message bus 145, and containers 147. The dynamic agent 138B may have visibility for the cluster 137B that it runs on and no other cluster 137. Upon determining that the code has meet the criteria defined by (i.e. "passed") all of the gates 140, the static engine 132A may provide configuration information for each gate 141 such as API routes, paths, authentication keys, and other configurations for the gates 141 as well as API routes, paths, authentication keys, and other configurations for any applicable static analysis tools 135 (e.g., static analysis tools 135A and 135B used to implement gates 141B and 141C respectively).

As discussed above, the dynamic agent 138B may operate in a minimal functionality "listening mode" in which it may listen for requests to perform dynamic analysis of code without executing any other functionality continuously, thereby conserving the resources of the cluster 137B. The dynamic agent 138B ma utilize a web hook to receive the API call with the request from static engine 132A, gather the configuration information included with the request and instantiate a full functionality dynamic agent 138B. The static engine 132A may then use another API call to send the code to the dynamic agent 138B. Upon receiving the code, dynamic agent 138B may push the code through the message bus 145 to a container 147A where the code will be run (executed). The message bus 145 may allow for bi-directional discovery and enable the code to leverage the dynamic agent 138B to send information (e.g., results of the dynamic analysis) in a secure manner back to the static engine 132A. This is valuable for systems that employ strict firewall controls because a single port can be opened for multi-service communication. The dynamic agent 138B performs a dynamic analysis on the live code based on the configuration information sent by the static engine 132A. More specifically, the dynamic agent 138B may utilize the configuration information to invoke the gates 141 as well as invoke any applicable static analysis tools 135.

The dynamic agent 138B may perform dynamic analysis on the code while it is executing in container 147A using the ruleset of each gate 141 to ensure that the code meets certain heightened standards for hardware resource usage (hereinafter referred to as resource usage), code security, code complexity and other CVEs that apply to advanced stages of development such as staging or production. The dynamic analysis may provide a deeper level of production readiness by allowing for more in-depth testing such as integration and end to end testing. The dynamic agent 138B may leverage readiness and liveliness probes internally which would be impossible to run from a security perspective outside of the cluster 137B. As discussed above, the gates 141 may include rulesets that include operators and other advanced features for defining criteria appropriate for advanced stages of development such as staging and production.

For example, gate 141A may include a ruleset defining a resource utilization profile that represents the optimal range of resource usage for the code. The resource utilization profile may be user defined by the rules engine 134 which may allow a user to define upper and lower bounds of resource usage for various different resources for the code. Examples of resources used by the code may include memory usage, I/O cycle usage, network bandwidth usage and processor bandwidth usage among others.

The dynamic agent 138B may obtain actual (e.g., real time) resource usage information of the code while it is executing within the container 147A. The dynamic agent 138B may poll the underlying hardware (e.g., the physical machine or computing device that the container 147A is running on—in this case, cluster 137B or the hardware that cluster 137B runs on if cluster 137B is a VM) that the code is executing on to obtain actual resource usage information of the code during execution such as memory usage, I/O cycles usage, network bandwidth usage, and processor bandwidth usage. The dynamic agent 138B may leverage operating system tools (e.g., the top command) to obtain such resource usage information. The dynamic agent 138B may also obtain the resource usage of the code relative to cluster 137B as a whole (e.g., memory usage, I/O operations usage, network bandwidth usage, and processor bandwidth usage) in a similar manner. In some embodiments, dynamic agent 138B may compare the actual resource usage information with the optimal resource usage criteria specified in gate 141A to determine if the code is operating outside the defined optimal parameters of resource usage for the code. For example, gate 141A may specify that the code must run on 20 MB of RAM and not utilize more than 2% of the processor bandwidth.

If the actual resource usage of the code is outside of the parameters defined in the gate 141A with respect to any of the resources (e.g., memory usage, I/O cycles, network bandwidth, and processor bandwidth among other resource usage metadata), the dynamic agent 138 may determine that the code has failed the gate 141A and take one or more actions based on any applicable actions defined in the ruleset of the gate 141A. For example, the dynamic agent 138B may have access to the internal CI/CD process for lifecycle management of the code, as well as git references to previously deployed versions of the code. The dynamic agent 138B may use a git reference to fetch the appropriate previous version of the code via the internal CI/CD process and rebuild/redeploy the code to the previously deployed version of the code (a rollback). In this way, a previously validated version of the code may be restored. In other examples, upon determining that the code is outside of the parameters defined in the gate 141A with respect to any of the resources, dynamic agent 138 may flag that usage for review by a user. The dynamic agent 138B may provide logs of the resource usage for analysis by a user. In some embodiments, the ruleset of gate 141A may instruct the dynamic agent 138B to first attempt a restart of the code, then a rollback of the code if the restart does not remedy the issue, and then flag the usage and provide usage logs for review by a user. In this way, the dynamic analysis performed by the dynamic agent 138 may protect the production version of the code from potential resource issues such as memory leaks and processor overutilization.

In some embodiments, the gate 141A may specify actions to take if the resource usage of the code for one or more resources is nearing a resource usage threshold. For example, in response to dynamic agent 138B determining that the resource usage of the code is nearing a threshold usage for one or more resources, the ruleset of gate 141A may instruct the dynamic agent 138B to take any of a number of actions such as load balancing, proxying a request, changing a queuing order to first in first out (FIFO) or last in first out (LIFO), or spinning up another cluster 137.

The dynamic agent 138B may also utilize the configuration information sent by the static engine 132A in the request to invoke the rulesets of gates 141B and 141C as well as any applicable static analysis tools 135. The dynamic agent 138B may configure static analysis tools 135A and 135B with gates 141B and 141C respectively and analyze the code to ensure that the code meets certain heightened standards for code security, complexity and other CVEs that apply to advanced stages of development such as staging and production. As discussed above, the gates 141B and 141C may include rule sets that include operators and other advanced features for defining criteria appropriate for advanced stages of development such as staging and production.

In some embodiments, upon determining that the code does not pass one or more gates 141, the dynamic agent 138B may attempt to resolve the issue at each gate 141 that was not passed based on actions defined in the ruleset for gates 141 that were not passed. For example, if a vulnerable dependency that exceeds a major vulnerability is detected through static analysis tool 135A (implementing gate 141B), dynamic agent 138B may roll back the dependency version to a previous version and in some embodiments, may automatically commit the change back into the git repository 131 (via the static engine 132A). In some embodiments, the ruleset of gate 141B may instruct the dynamic agent 138B to automatically implement patch level changes, while for more significant roll backs the dynamic agent 138B may notify a user that manual intervention is required. Thus, in this scenario the gate 141B may be marked as not passed and the code may not be promoted to the next stage in the development lifecycle.

The dynamic agent 138B may provide the results of the dynamic analysis to a user/developer and then return to the minimal functionality "listening mode." In this way, the resources of the cluster 137B are preserved because the dynamic analysis functionality of the dynamic agent 138B is not continuously running therein. In some embodiments, one or more functions of the dynamic agent 138B may run beyond completion of the dynamic analysis as discussed in further detail herein. Although illustrated and described with analysis being performed with rulesets from 2 environments and 1 code component for ease of illustration, it should be noted that analysis may be performed simultaneously for multiple code components/modules for each environment. For example, a code component may be analyzed by the static engine using a first set of gates in a development environment, then promoted to a testing environment where the static engine may analyze the code using a second set of gates having stricter criteria. If it is validated by all the gates of the second set, the static engine may promote the code to the staging environment, where a dynamic agent may perform analysis of the code using a third set of gates. If it does not pass one or more of the third set of gates, the dynamic agent may attempt to automatically remedy the issue(s), and if successful, may promote the code to the development environment where the dynamic agent may analyze the code using a fourth set of gates. If the code is validated based on the fourth set of gates, it may be deployed to users.

Figure 3:
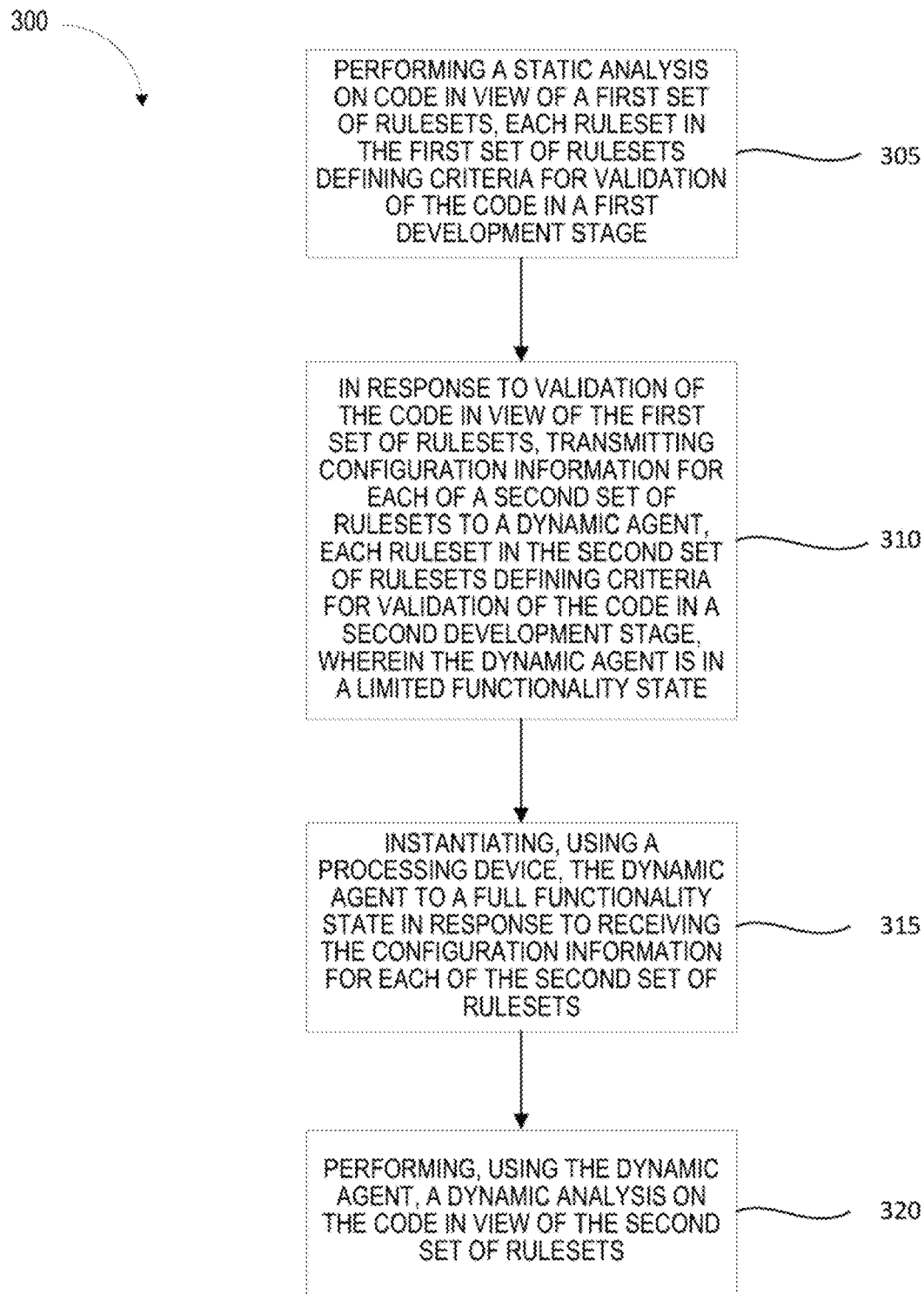
FIG. 3 is a flow diagram of an example method for testing code, in accordance with some embodiments of the present disclosure.

FIG. 3 is a flow diagram illustrating a method 300 for testing and debugging code, in accordance with some embodiments of the present disclosure. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 300 may be performed by one or more computing devices (e.g., computing device 130C and a computing device of cluster 137B illustrated in FIGS. 1. and 2).

At block 305, processing logic (via the static engine 132A) may perform a static analysis of code in view of a first set of rulesets, each ruleset in the first set of rulesets defining criteria for validation of the code in a first development stage (e.g., an early environment). Because services such as the git repository 131 and static analysis tools 135 may be hook based, processing logic may connect to these services using API calls. The processing logic may detect when a change has been committed to the git repository 131. Examples of a change may include creation of a new branch, for example. The processing logic may detect when a change has been committed by polling the git repository or responding to a git hook, for example. Upon detecting a change, the processing logic may apply the ruleset of one or more gates to the code to ensure that the code meets certain minimum standards for code security, complexity and other CVEs. For example, because the code has recently been changed, analysis at the development environment level may be appropriate and the processing logic may apply the gates 140 to the code to ensure that the code meets certain minimum standards for code security, complexity and other CVEs. The processing logic may access each gate 140 from computing device 130B using an API call and send an API call to each static analysis tool 135 that is required for implementing the gates 140. For example, the processing logic may send an API call to static analysis tool 135A which is a tool for analyzing code security. The processing logic may configure static analysis tool 135A with the gate 140A and run the static analysis tool 135A on the code to determine whether the code has any security vulnerabilities. For example, the ruleset of gate 140A may instruct the static analysis tool 135A to look for vulnerabilities of any level (minor, major, critical, blocker) and flag those that are above a major vulnerability as unacceptable. The processing logic may apply the ruleset of each of the gates 140 to the code in a similar manner before verifying that the code is safe and stable enough to enter into the next environment (stage of development) which may analyze the code using a dynamic agent 138 as discussed in further detail herein.

In some embodiments, upon determining that the code does not pass one or more gates 140, the processing logic (via static engine 132A) may attempt to automatically (e.g., without user intervention or user input) resolve the issue at each gate that was not passed based on actions defined in the ruleset for gates that were not passed. For example, if a vulnerable dependency that exceeds a major vulnerability is detected through static analysis tool 135A (implementing the ruleset of gate 140A), the processing logic may roll back the dependency version to a previous version. The processing logic may have access to the internal CI/CD process (not shown) for lifecycle management of the code, as well as git references to previously deployed versions of the code. The processing logic may use the git reference corresponding to the appropriate previous version of the code to fetch that version of the code via the internal CI/CD process and rebuild/redeploy the code to the previously deployed version of the code (a rollback). In this way, a previously validated version of the code may be restored. In some embodiments, the processing logic may automatically commit the change back into the git repository 131 based on the ruleset of gate 140A. In other embodiments, the ruleset of gate 140A may instruct the processing logic to automatically implement patch level changes, while for more significant roll backs the processing logic may notify a user that manual intervention is required. Thus, in this scenario, the processing logic may mark the gate 140A as "not passed" and the code may not be promoted to the next stage in the development lifecycle (e.g., from testing to staging or production). The ruleset of gate 140A may also or alternatively include instructions/ actions to flag code that does not meet the criteria (e.g., detection of a major vulnerability) as unacceptable and require the developers to address the issue or perform a rollback etc.

At block 310, in response to validation of the code in view of the first set of rulesets, the processing logic (via static engine 132A) may transmit configuration information for each of a second set of rulesets to the dynamic agent 138B, each ruleset in the second set of rulesets defining criteria for validation of the code in a second development stage, wherein the dynamic agent 138B is in a limited functionality state. The dynamic agent 138B may run on a cluster 137B, which is one of a number of clusters 137. Each cluster 137 may include two or more nodes (or members) that work together to perform a task. The nodes of a cluster 137 may be comprised of computing devices, virtual machines, or any combination thereof. Each cluster 137 may include cluster management software (not shown) that provides fundamental functions for the nodes to work together as a cluster (e.g., configuration-file management, membership management, lock management, and fencing). Each cluster 137 may also include software to automate deployment, scaling, and management of containers (illustrated in FIG. 2) and containerized applications. For example, each cluster 137 may run the Kubernetes™ system for managing the deployment of containers and containerized applications. Each cluster 137 may include a master node that acts as the unified endpoint for the cluster. All interactions with a cluster 137 are done via API calls, and the master node runs an API server process to handle those requests. The static engine 132A can make API calls directly via HTTP, gRPC or any other appropriate method. The dynamic agent 138B may reside on the cluster 137B in a limited functionality "listening" mode in which its resource consumption is minimal and can instantiate a full functionality version of itself on an as needed basis. For example, if the processing logic analyzes code based on gates 140 (as discussed above) and determines that the code meets the criteria defined by all of the gates 140, the static engine 132A may send a request to the dynamic agent 138B to perform a dynamic analysis of the code (e.g., in connection with a subsequent environment), causing the dynamic agent 138B to activate a full functionality instance of itself. The request may include configuration information for each gate 141 such as API routes, paths, authentication keys, and other configurations for the gates 141 as well as API routes, paths, authentication keys, and other configurations for any applicable static analysis tools 135 (e.g., static analysis tools 135A and 135B used to implement gates 141B and 141C respectively).

At block 315, the processing logic may instantiate a full functionality version of the dynamic agent 138B in response to receiving the configuration information of each of the second set of rulesets. As discussed above, the dynamic agent 138B may operate in a minimal functionality "listening mode" in which it may listen for requests to perform dynamic analysis of code without executing any other functionality continuously, thereby conserving the resources of the cluster 137B. The processing logic (via the logic dynamic agent 138B) may utilize a web hook to receive the API call with the request from static engine 132A, gather the configuration information included with the request and instantiate a full functionality dynamic agent 138B. The static engine 132A may then use another API call to send the code to the dynamic agent 138B. Upon receiving the code, dynamic agent 138B may push the code through the message bus 145 to a container 147A where the code will be run (executed). The message bus 145 may allow for bi-directional discovery and enable the code to leverage the dynamic agent 138B to send information (e.g., results of the dynamic analysis) in a secure manner back to the static engine 132A. This is valuable for systems that employ strict firewall controls because a single port can be opened for multi-service communication.

At block 320, the processing logic may perform, using the dynamic agent 138B, dynamic analysis on the code based on the configuration information sent by the static engine 132A. The processing Logic may utilize the configuration information to invoke the gates 141 as well as invoke any applicable static analysis tools 135.

Figure 4:
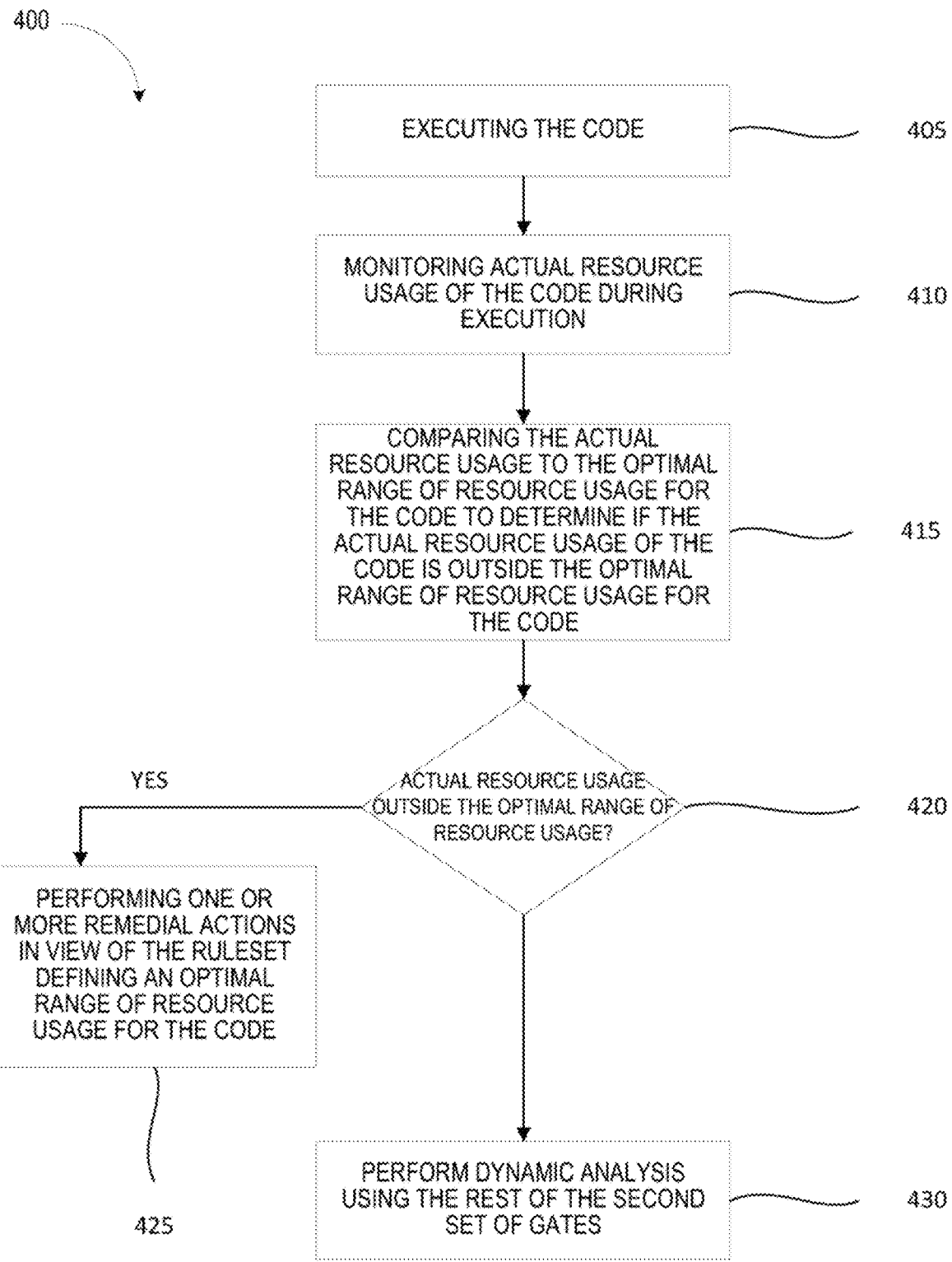
FIG. 4 is a flow diagram of an example method, in accordance with some embodiments of the present disclosure.

FIG. 4 is a flow diagram illustrating a method 400 for performing a dynamic analysis of code, in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a computing device(s) (e.g., the cluster 137B illustrated in FIGS. 1 and 2).

As discussed above, upon receiving the code and the request, the processing logic (via dynamic agent 138B) may push the code through the message bus 145 to a container 147 where, at block 405 the processing logic runs (executes) the code. The processing logic (via the dynamic agent 138B) may perform dynamic analysis on the code while it is executing in container 147A using the ruleset of each gate 141 to ensure that the code meets certain heightened standards for hardware resource usage (hereinafter referred to as resource usage), code security, code complexity and other CVEs that apply to advanced stages of development such as staging or production. The dynamic analysis may provide a deeper level of production readiness by allowing for more in-depth testing such as integration and end to end testing. The processing logic may leverage readiness and liveliness probes internally which would be impossible to run from a security perspective outside of the cluster 137B. As discussed above, the gates 141 may include rulesets that include operators and other advanced features for defining criteria appropriate for advanced stages of development such as staging and production.

For example, gate 141A may include a ruleset defining a resource utilization profile that represents the optimal range of resource usage (hereinafter referred to as resource usage) for the code. The resource utilization profile may be user defined by the rules engine 134 which may allow a user to define upper and lower bounds of resource usage for various different resources for the code. Examples of resources used by the code may include memory usage, ISO cycle usage, network bandwidth usage and processor bandwidth usage among others. For example, gate 141A may specify that the code must run on 20 MB of RAM and not utilize more than 2% of the processor bandwidth.

More specifically, at block 410, the processing logic may monitor the actual resource usage of the code during execution to obtain a real time resource usage profile of the code while it is executing within the container 147A. The processing logic may poll the underlying hardware (e.g., the actual machine or computing device that the container 147A is running on) that the code is executing on to obtain actual resource usage information of the code during execution such as memory usage, I/O cycles usage, network bandwidth usage, and processor bandwidth usage. The processing logic may leverage operating system tools (e.g., the top command) to obtain such resource usage information. The processing logic may also obtain the resource usage of the code relative to cluster 137B as a whole (e.g., memory usage, I/O operations usage, network bandwidth usage, and processor bandwidth usage) in a similar manner. In some embodiments, at block 415, the processing logic may compare the actual resource usage information with the optimal range of resource usage criteria specified in gate 141A to determine if the code is operating outside of its defined optimal range of resource usage.

At block 420, the processing logic (via dynamic agent 138B) may determine if the code is operating outside the defined optimal parameters for resource usage defined in the gate 1411 with respect to any of the resources (e.g., memory usage, I/O cycles, network bandwidth, and processor bandwidth among other resource usage metadata). At block 425, if the actual resource usage of the code is outside of the parameters defined in the gate 141A with respect to any of the resources (e.g., memory usage, I/O cycles, network bandwidth, and processor bandwidth among other resource usage metadata), the processing logic may determine that the code has failed the gate 141A and take one or more actions based on any applicable actions defined in the ruleset of the gate 141A. For example, the processing logic may have access to the internal CI/CD process for lifecycle management of the code, as well as git references to previously deployed versions of the code. The processing logic may use a git reference to fetch the appropriate previous version of the code via the internal CI/CD process and rebuild/redeploy the code to the previously deployed version of the code (a rollback). In this way, a previously validated version of the code may be restored. In other examples, upon determining that the code is outside of the parameters defined in the gate 141A with respect to any of the resources, the processing logic may flag that usage for review by a user. The processing logic may provide logs of the resource usage for analysis by a user. In some embodiments, the ruleset of gate 141A may instruct the processing logic to first attempt a restart of the code, then a rollback of the code if the restart does not remedy the issue, and then flag the usage and provide usage logs for review by a user. In this way, the dynamic analysis performed by the processing logic may protect the production version of the code from potential resource issues such as memory leaks and processor overutilization.

In some embodiments, the gate 141A may specify actions to take if the resource usage of the code for one or more resources is nearing an upper threshold of the defined optimal range of resource usage. For example, in response to the processing logic determining that the resource usage of the code is nearing a threshold usage for one or more resources, the ruleset of gate 14 1A may instruct the processing logic to take any of a number of actions such as load balancing, proxying a request, changing a queuing order to first in first out (FIFO) or last in first out (LIFO), or spinning up another cluster 137.

At block 430, the processing logic may utilize the configuration information sent by the static engine 132A in the request to invoke the rulesets of gates 141B and 141C as well as any applicable static analysis tools 135 and perform the dynamic analysis based on the rulesets of gates 141B and 141C. The processing logic may configure static analysis tools 135A and 135B with the rulesets of gates 141B and 141C respectively and analyze the code to ensure that the code meets certain heightened standards for code security, complexity and other CVEs that apply to advanced stages of development such as staging and production. As discussed above, the gates 141B and 141C may include rulesets that include operators and other advanced features for defining criteria appropriate for advanced stages of development such as staging and production.

In some embodiments, upon determining that the code does not pass one or more gates 141, the dynamic agent 138B may attempt to resolve the issue at each gate 141 that was not passed based on actions defined in the ruleset for gates 141 that were not passed. For example, if a vulnerable dependency that exceeds a major vulnerability is detected through static analysis tool 135A (implementing gate 141B), the processing logic may roll back the dependency version to a previous version and in some embodiments, may automatically commit the change back into the git repository 131 (via the static engine 132A). In some embodiments, the ruleset of gate 141B may instruct the dynamic agent 138B to automatically implement patch level changes, while for more significant roll backs the dynamic agent 138B may notify a user that manual intervention is required. Thus, in this scenario the gate 141B may be marked as not passed and the code may not be promoted to the next stage in the development lifecycle.

Upon completion of the dynamic analysis, the processing logic may provide the results of the dynamic analysis to a user/developer and then return the dynamic agent 138B to the minimal functionality "listening mode." In this way, the resources of the cluster 137B are preserved because the dynamic analysis functionality of the dynamic agent 138B is not continuously running therein. In some embodiments, one or more functions of the dynamic agent 138B may run beyond completion of the dynamic analysis as discussed in further detail herein. The dynamic agent 138B may have visibility for the cluster 137B that it runs on and no other cluster 137. The results may include an indication of whether the code was validated, or which gates 141 were failed. With respect to the gates 141 that were failed, the results may indicate what remedial actions were taken, if any, and indicate what issues were flagged for review by a user/developer.

Figure 5:
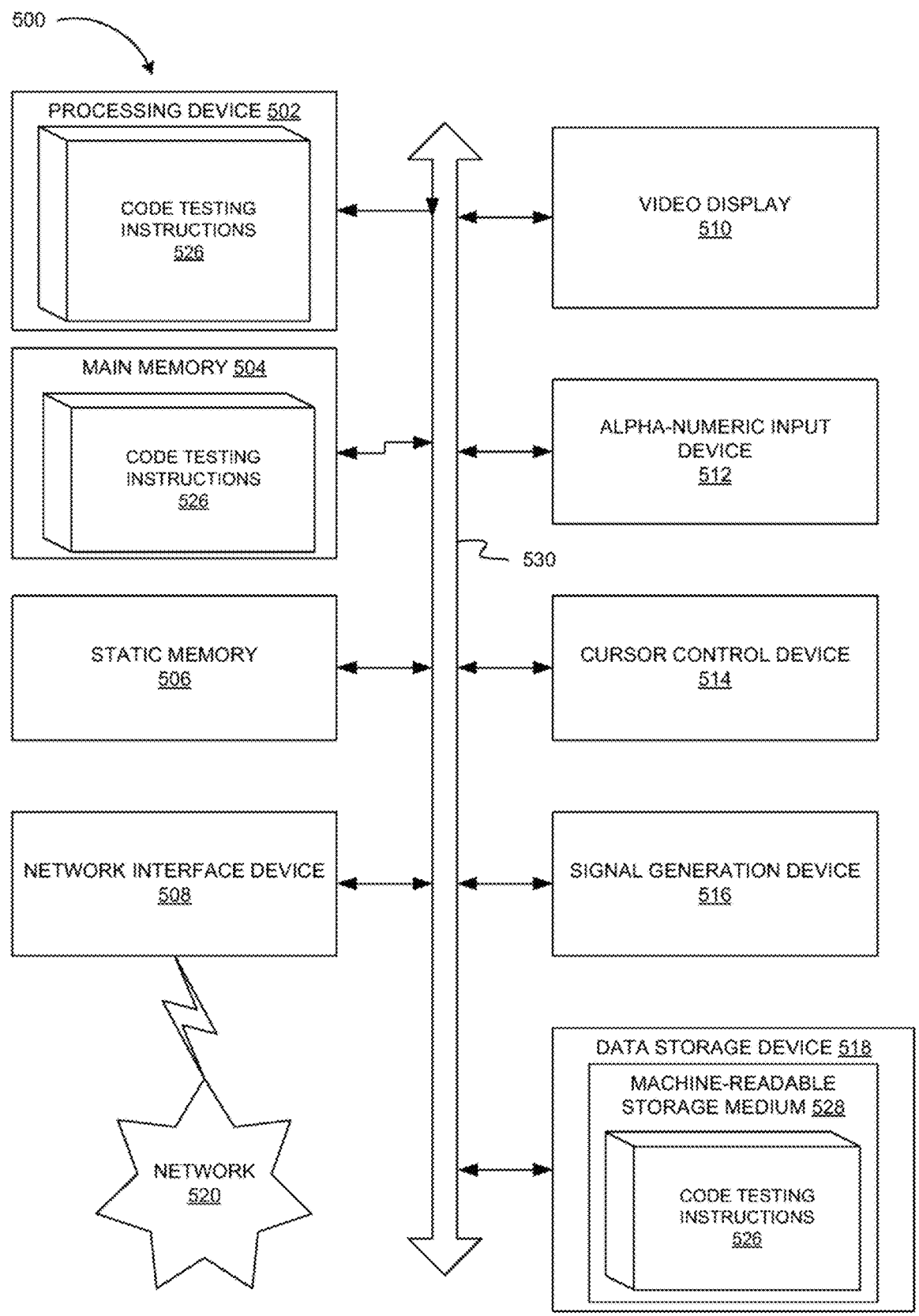
FIG. 5 is a block diagram of an example computing device, in accordance with some embodiments of the present disclosure.

FIG. 5 illustrates a diagrammatic representation of a machine in the example form of a computer system 500 within which a set of instructions, for causing the machine to perform any one or more of the methodologies discussed herein for testing code. More specifically, the machine may perform a static analysis on code in view of a first set of rulesets, each ruleset in the first set of rulesets defining criteria for validation of the code in a first development stage. In response to validation of the code in view of the first set of rulesets, the machine may transmit configuration information for each of a second set of rulesets to a dynamic agent, each ruleset in the second set of rulesets defining criteria for validation of the code in a second development stage, and wherein the dynamic agent is in a limited functionality state. The dynamic agent may be brought to a full functionality state in response to receiving the configuration information for each of the second set of rulesets and may perform a dynamic analysis on the code in view of the second set of rulesets.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 500 may be representative of a computing device, such as computing device 130C configured to perform one or more functions described herein.

The exemplary computer system 500 includes a processing device 502, a main memory 504 (e.g., read-only memory (ROM), flash memory, dynamic random access memory (DRAM), a static memory 506 (e.g., flash memory, static random access memory (SRAM), etc.), and a data storage device 518, which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 500 may further include a network interface device 508 which may communicate with a network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute code testing instructions 526, for performing the operations and steps discussed herein.

The data storage device 518 may include a machine-readable storage medium 528, on which is stored one or more sets of code testing instructions 526 (e.g., software) embodying any one or more of the methodologies of functions described herein, including instructions to cause the processing device 502 to perform one or more of the functions described herein. The code testing instructions 526 may also reside, completely or at least partially, within the main memory 504 or within the processing device 502 during execution thereof by the computer system 500; the main memory 504 and the processing device 502 also constituting machine-readable storage media. The instructions 526 may further be transmitted or received over a network 520 via the network interface device 508.

The machine-readable storage medium 528 may also be used to store instructions to perform a method for object analysis/validation event publishing, as described herein. While the machine-readable storage medium 528 is shown in an exemplary embodiment to be a single medium, the term "machine-readable storage medium" should be taken to include a single medium or multiple media e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method comprising:
    performing, by a processing device, a static analysis on code in view of a first set of rulesets, each ruleset in the first set of the rulesets defining criteria for validation of the code in a first development stage;
    in response to validation of the code in view of the first set of the rulesets, transmitting, by the processing device, configuration information for each ruleset in a second set of the rulesets to a dynamic agent that is in a limited functionality state such that the dynamic agent is incapable of performing a dynamic analysis on the code, the each rulesets in the second set of the rulesets defining criteria for validation of the code in a second development stage;
    returning, by the processing device, the dynamic agent from the limited functionality state to a full functionality state in response to receiving the configuration information for the each ruleset in the second set of the rulesets;
    performing, by the processing device using the dynamic agent in the full functionality state, the dynamic analysis on the code in view of the second set of the rulesets; and
    returning, by the processing device, the dynamic agent to the limited functionality state upon completion of the dynamic analysis.

2. The method of claim 1, wherein the second set of the rulesets comprises:
    a ruleset defining an optimal range of resource usage for the code, the resource usage including memory usage, processing device usage and input/output cycle usage;
    one or more rulesets defining code security criteria; and
    one or more rulesets defining code complexity criteria.

3. The method of claim 1, wherein the first set of the rulesets comprises:
    one or more rulesets defining code security criteria; and
    one or more rulesets defining code complexity criteria.

4. The method of claim 2, wherein performing the dynamic analysis comprises:
    executing the code;
    monitoring actual resource usage of the code during execution;
    comparing the actual resource usage to the optimal range of resource usage for the code to determine if the actual resource usage of the code is outside the optimal range of resource usage for the code; and
    in response to determining that the actual resource usage of the code is outside the optimal range of resource usage for the code, performing one or more remedial actions in view of the ruleset defining the optimal range of resource usage for the code.

5. The method of claim 3, wherein performing the static analysis comprises:
    for the each ruleset in the first set of the rulesets:
    invoking an associated static analysis tool;
    configuring the associated static analysis tool with the ruleset; and
    analyzing the code using the associated static analysis tool.

6. The method of claim 1, further comprising:
    in response to the code not being validated with respect to one or more ruleset in the second set of the rulesets, performing one or more remedial actions in view of the one or more ruleset in the second set of the rulesets.

7. A system comprising:
a memory;
a processing device, operatively coupled with the memory, to:
perform a static analysis on code in view of a first set of rulesets, each ruleset in the first set of the rulesets defining criteria for validation of the code in a first development stage;
in response to validation of the code in view of the first set of the rulesets, transmit configuration information for each ruleset in a second set of the rulesets to a dynamic agent that is in a limited functionality state such that the dynamic agent is incapable of performing a dynamic analysis on the code, the each ruleset in the second set of the rulesets defining criteria for validation of the code in a second development stage;
return the dynamic agent from the limited functionality state to a full functionality state in response to receiving the configuration information for the each ruleset in the second set of the rulesets;
perform, using the dynamic agent in the full functionality, the dynamic analysis on the code in view of the second set of the rulesets; and
return the dynamic agent to the limited functionality state upon completion of the dynamic analysis.

8. The system of claim 7, wherein the second set of the rulesets comprises:
a ruleset defining an optimal range of resource usage for the code, the resource usage including memory usage, processing device usage and input/output (I/O) cycle usage;
one or more rulesets defining code security criteria; and
one or more rulesets defining code complexity criteria.

9. The system of claim 7, wherein the first set of the rulesets comprises:
one or more rulesets defining code security criteria; and
one or more rulesets defining code complexity criteria.

10. The system of claim 8, wherein to perform the dynamic analysis, the processing device is further to:
execute the code;
monitor actual resource usage of the code during execution;
compare the actual resource usage to the optimal range of resource usage for the code to determine if the actual resource usage of the code is outside the optimal range of resource usage for the code; and
in response to determining that the actual resource usage of the code is outside the optimal range of resource usage for the code, perform one or more remedial actions in view of the ruleset defining the optimal range of resource usage for the code.

11. The system of claim 9, wherein to perform the static analysis, the processing device is further to:
for the each ruleset in the first set of the rulesets:
invoke an associated static analysis tool;
configure the associated static analysis tool with the ruleset; and
analyze the code using the associated static analysis tool.

12. The system of claim 7, wherein the processing device is further to:
in response to the code not being validated with respect to one or more ruleset in the second set of the rulesets, perform one or more remedial actions in view of the one or more ruleset in the second set of the rulesets.

13. A non-transitory computer-readable storage medium including instructions that, when executed by a processing device, cause the processing device to:
perform a static analysis on code in view of a first set of rulesets, each ruleset in the first set of the rulesets defining criteria for validation of the code in a first development stage;
in response to validation of the code in view of the first set of the rulesets, transmit configuration Information for each ruleset in a second set of the rulesets to a dynamic agent that is in a limited functionality state such that the dynamic agent is incapable of performing a dynamic analysis of the code, the each ruleset in the second set of the rulesets defining criteria for validation of the code in a second development stage;
return the dynamic agent from the limited functionality state to a full functionality state in response to receiving the configuration information for the each ruleset in the second set of the rulesets;
perform, by the dynamic agent in the full functionality state, the dynamic analysts on the code in view of the second set of the rulesets; and
return the dynamic agent to the limited functionality state upon completion of the dynamic analysis.

14. The non-transitory computer-readable storage medium of claim 13, wherein the second set of the rulesets comprises:
a ruleset defining an optimal range of resource usage for the code, the resource usage including memory usage, processing device usage and input/output (I/O) cycle usage;
one or more rulesets defining code security criteria; and
one or more rulesets defining code complexity criteria.

15. The non-transitory computer-readable storage medium of claim 13, wherein the first set of the rulesets comprises:
one or more rulesets defining code security criteria; and
one or more rulesets defining code complexity criteria.

16. The non-transitory computer-readable storage medium of claim 14, wherein to perform the dynamic analysis, the processing device is further to:
execute the code;
monitor actual resource usage of the code during execution;
compare the actual resource usage to the optimal range of resource usage for the code to determine if the actual resource usage of the code is outside the optimal range of resource usage for the code; and
in response to determining that the actual resource usage of the code is outside the optimal range of resource usage for the code, perform one or more remedial actions in view of the rulesets defining the optimal range of resource usage for the code.

17. The non-transitory computer-readable storage medium of claim 15, wherein to perform the static analysis, the processing device is further to:
for the each ruleset in the first set of the rulesets;
Invoke an associated static analysis tool;
configure the associated static analysis tool with the ruleset; and
analyze the code using the associated static analysis tool.

18. The non-transitory computer-readable storage medium of claim 13, wherein the processing device is further to:
in response to the code not being validated with respect to one or more rulesets in the second set of the rulesets, perform one or more remedial actions In view of the one or more rulesets in the second set of the rulesets.

* * * * *